(12) United States Patent
Jen

(10) Patent No.: US 11,688,103 B2
(45) Date of Patent: Jun. 27, 2023

(54) SYSTEM AND METHOD FOR COLOR ANALYSIS

(71) Applicant: Jenco Electronics, Ltd., Taipei (TW)

(72) Inventor: Stephen Jen, Taipei (TW)

(73) Assignee: Jenco Electronics, Ltd., Taipei (TW)

( * ) Notice: Subject to any disclaimer, the term of this patent is extended or adjusted under 35 U.S.C. 154(b) by 175 days.

(21) Appl. No.: 17/314,008

(22) Filed: May 6, 2021

(65) Prior Publication Data
US 2022/0358681 A1  Nov. 10, 2022

(51) Int. Cl.
| | |
|---|---|
| *G06T 7/90* | (2017.01) |
| *G06T 7/80* | (2017.01) |
| *G06V 10/10* | (2022.01) |
| *G06V 10/56* | (2022.01) |
| *G06V 10/141* | (2022.01) |
| *H04N 23/74* | (2023.01) |

(52) U.S. Cl.
CPC .................. *G06T 7/90* (2017.01); *G06T 7/80* (2017.01); *G06V 10/141* (2022.01); *G06V 10/17* (2022.01); *G06V 10/56* (2022.01); *H04N 23/74* (2023.01)

(58) Field of Classification Search
CPC ........... G06T 7/90; G06T 7/80; G06V 10/141; G06V 10/17; G06V 10/56; H04N 5/2354; H04N 1/6033; H04N 1/6086; A61B 5/00; G01J 3/46

USPC ........................................................ 382/165
See application file for complete search history.

(56) References Cited

U.S. PATENT DOCUMENTS

| | | | | |
|---|---|---|---|---|
| 3,232,710 | A * | 2/1966 | Rieckmann | G01N 33/521 436/95 |
| 3,632,217 | A * | 1/1972 | Bartleson | H04N 17/04 356/213 |
| 4,211,532 | A * | 7/1980 | Tobari | G01N 33/04 436/166 |
| 2003/0204410 | A1* | 10/2003 | Agarwal | G01J 3/524 382/162 |
| 2017/0156609 | A1* | 6/2017 | Yuan | A61B 5/02427 |

* cited by examiner

*Primary Examiner* — Ali Bayat

(57) ABSTRACT

The invention is a system for color analysis, which comprises a hand-held device and a working platform. The hand-held device is provided with a camera and installed with analysis software. The work platform is placed with an object to be tested, a standard color carrier is installed at both front and rear sides or at both left and right sides of the object to be tested, a positioning frame extends upward around the working platform, the positioning frame and the working platform are mutually formed an inclination angle, and the positioning frame is used to fix the hand-held device. In this way, the camera can shoot the working platform in an inclined direction, and then the analysis software is used to compare a color difference between the object to be tested and the standard color carrier to obtain analysis result of the object to be tested.

16 Claims, 4 Drawing Sheets

SYSTEM AND METHOD FOR COLOR ANALYSIS

BACKGROUND OF THE INVENTION

1. Field of the Invention

The invention belongs to the technical field of color analysis, in particular relates to system and method for color analysis that is easy to perform and can maintain correct inspection results.

2. Description of the Prior Art

The method of using color analysis to detect the state of a substance is a common technology in all walks of life, such as safety detection of water quality, environment and food, or deterioration detection of paint and dye, or health examination of body tissue.

The basic method for color analysis first needs to obtain a standard color, according to calibration data obtained by comparing the standard color with an ideal color, the color error of the shooting device is corrected, and then shoots the object to be tested and perform color analysis with the calibration data to determine the correct detection result. Therefore, how to reduce the interference of ambient light is the primary condition of color analysis technology.

In order to obtain the correct color, the color acquisition method of conventional technology is usually carried out in the environment with strict light control, so as to eliminate the interference of external light. However, under such conditions, testers cannot perform the operation in time. Instead, they need to sample, package, store the object to be tested, and then transport it to the relevant equipment for analysis, which is quite cumbersome. In addition, it is necessary to protect the object to be tested from the outside world during the process to avoid contamination, which will increase the cost of analysis and increase the possibility of detection errors.

Therefore, how to simplify the process of color analysis while maintaining the credibility of the analysis is an urgent issue to be solved in the industry.

SUMMARY OF THE INVENTION

The objective of the invention is to provide a system for color analysis, which has the advantages of simple structure, convenient use, instant analysis of sampling the object to be tested, and ensuring the reliability of the analysis results.

Another objective of the invention lies in its wide application field. As long as the standard color of the correct color is provided, the relevant color analysis of various industries can be performed.

The other objective of the invention is to provide a system and method for color analysis, which is light in structure, without bulky or complex devices, and easy in maintenance, so that users can operate safely without spending time on preparation or after maintenance chores.

A color analysis system that can achieve the above objectives includes a hand-held device and a working platform. The hand-held device comprises a camera and a storage element, wherein an analysis software is installed inside the storage element, and an ideal dataset corresponding to a plurality of ideal color is stored in the storage element. The work platform is placed with an object to be tested, at least one standard color carrier is set around the object to be tested, and a positioning frame extends upward around the working platform. The positioning frame and the working platform are mutually formed an inclination angle, and the positioning frame is used to fix the hand-held device.

By means of the above structure, the standard color carrier is prepared on the working platform, and the object to be tested is first positioned on the working platform when the invention is in use, then the hand-held device is fixed to the positioning frame, so that the camera can shoot the object to be tested in an inclined direction to obtain a standard image and a tested image, and then the analysis software compares a difference between the standard image and the ideal dataset to obtain calibrated data, and the analysis software obtains a color analysis result of the object to be tested with the calibrated data.

| Description of Reference Signs | | | |
|---|---|---|---|
| 100 | hand-held device | 110 | camera |
| 120 | storage element | 121 | ideal dataset |
| 122 | analysis software | 130 | photoflash lamp |
| 200 | working platform | 210 | positioning frame |
| 220 | shroud | 230 | auxiliary light source |
| 240 | pallet | 300 | object to be tested |
| 400 | standard color carrier | 500 | wall |
| θ | inclination angle | | |

DETAILED DESCRIPTION OF THE PREFERRED EMBODIMENTS

Figure 1:
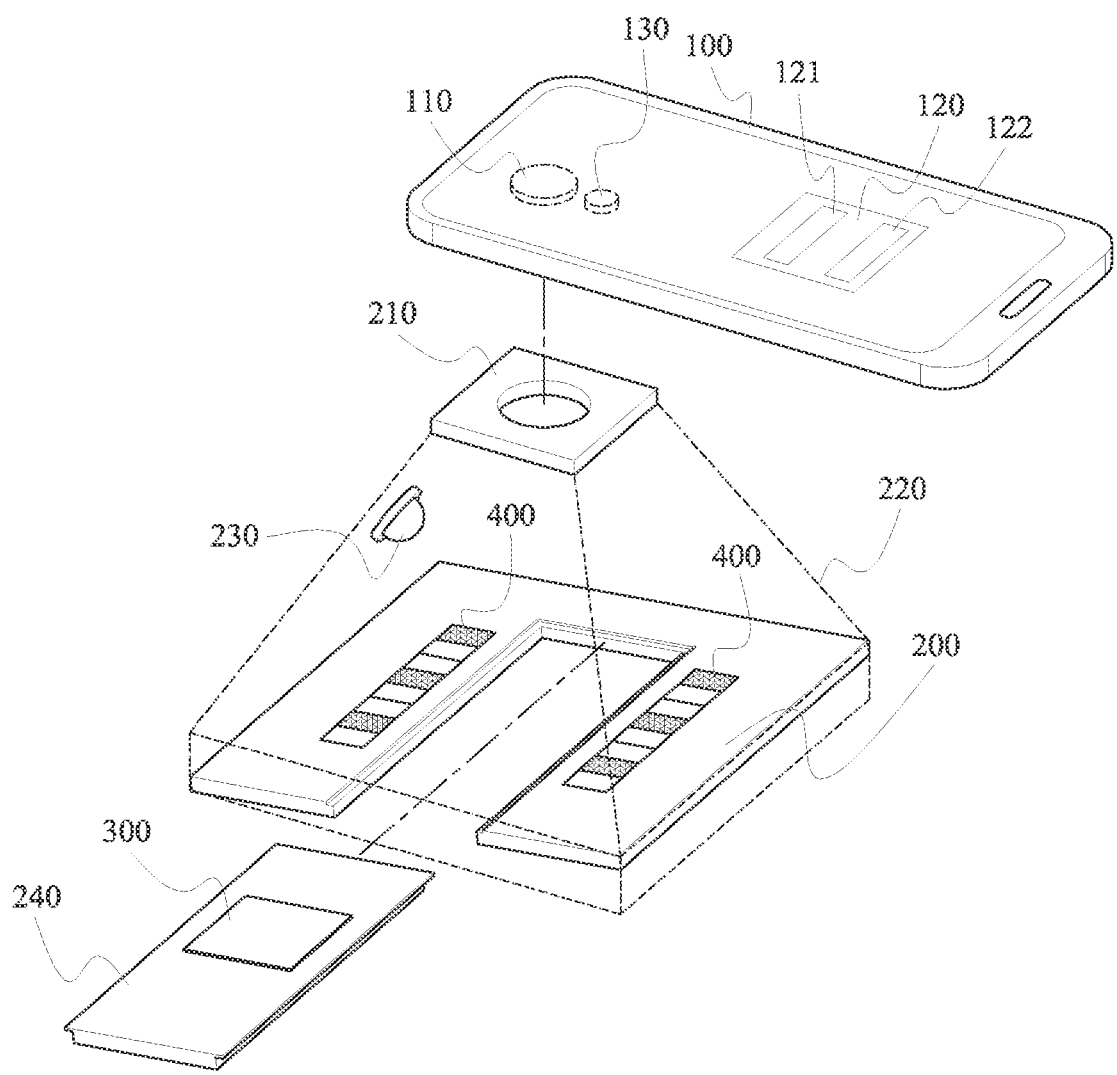
FIG. 1 is a structural perspective diagram of the invention.
Figure 2:
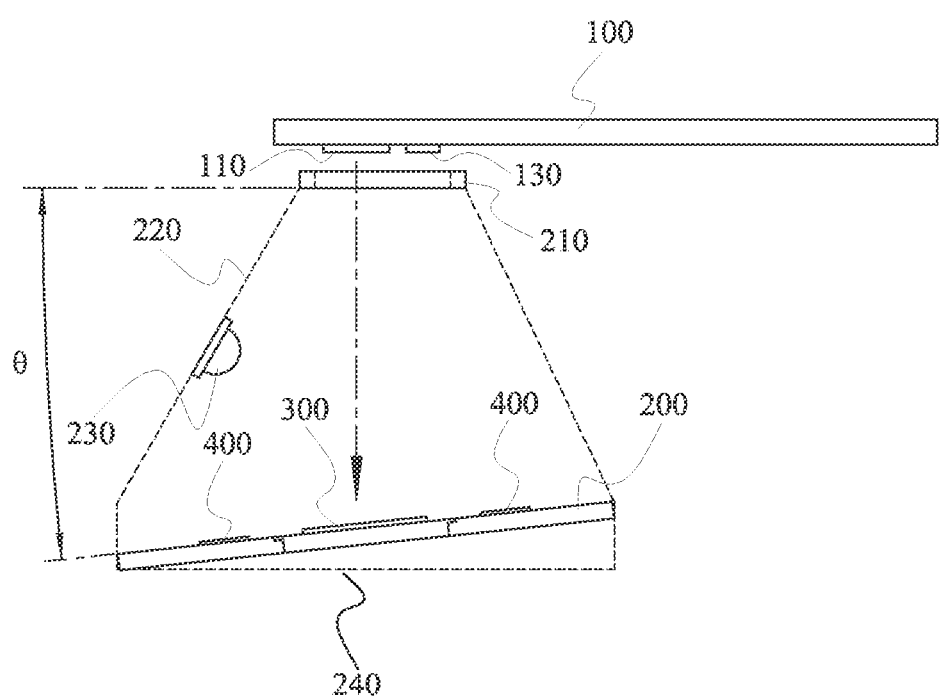
FIG. 2 is a structural plan diagram of the invention.
Figure 3:
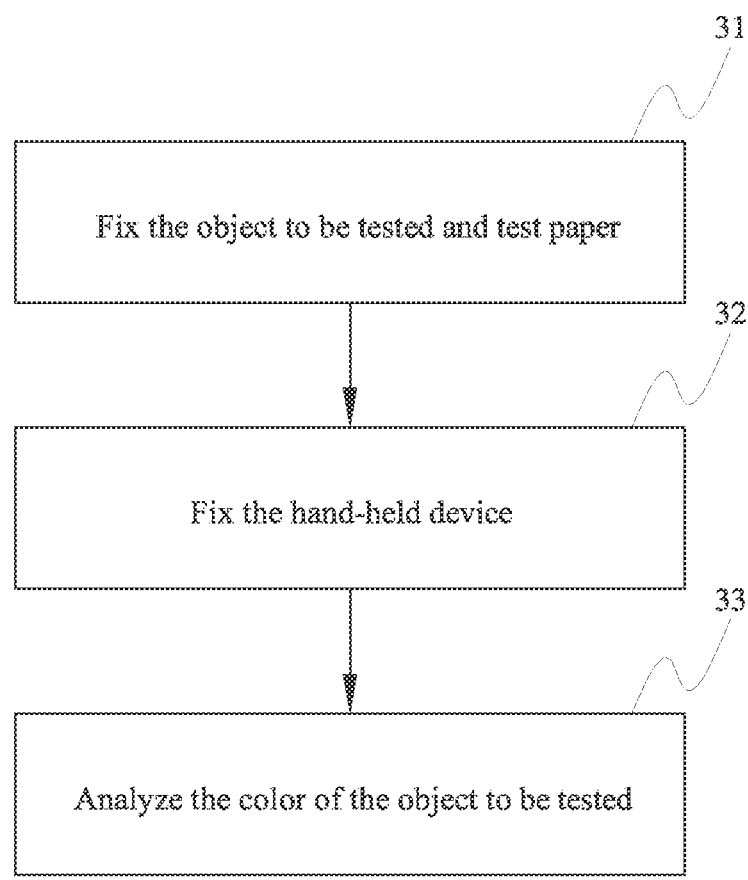
FIG. 3 is a flow chart of the invention.

Please refer to FIG. 1 to FIG. 3, the invention is a system for color analysis, which includes a hand-held device 100 and a working platform 200.

The hand-held device 100 is a mobile phone, a tablet, or other smart devices, which is provided with a camera 110 and a storage element 120. Wherein the storage element 120 stores an ideal dataset 121 corresponding to a plurality of ideal color, and the storage element 120 installed with analysis software 122. The working platform 200 provides a test space, in which an object to be tested 300 is placed, and at least one standard color carrier 400 (such as test paper) carrying a standard color is arranged around the object to be tested 300. A positioning frame 210 extends upward around the working platform 200. The positioning frame 210 and the working platform 200 are mutually formed an inclination angle θ, so that the lens 110 and the working platform 200 are also mutually formed an inclination angle θ. The positioning frame 210 is used to fix the hand-held device 100.

The key point of the invention is to eliminate the influence of ambient light on shooting to ensure that a true color of the object to be tested 300 is obtained. Therefore, it is avoided that the camera 110 is vertically aligned with the object to be tested 300, but an inclined direction is adopted to shoot the working platform 200.

In addition, the standard color carrier 400 can be installed at both the front and rear sides or at both the left and right sides of the object to be tested 300 simultaneously, and the color difference between the object to be tested 300 and the two standard color carriers 400 can be compared by using the analysis software 122 to further eliminate the influence of the ambient light on the color change of the object to be tested 300. If necessary, a plurality of the standard color carriers 400 can be installed at both the front and rear sides or at both the left and right sides of the object to be tested 300 to perform more accurate color difference analysis.

By means of the above structure, the implementation method of the invention is as follows:

Step 31: Fixing the object to be tested 300 and the at least one standard color carrier 400 with the standard color, so that the at least one standard color carrier 400 is arranged around the object to be tested 300;

Step 32: Fixing the hand-held device 100 so that an inclination angle θ is formed between the camera 110 and the object to be tested 300, and then the object to be tested 300 and the at least one standard color carrier 400 are shot respectively to obtain a standard image and a tested image;

Step 33: Using the analysis software 122 in the hand-held device 100 to compare the difference between the colors of the standard image and the colors of the ideal image to obtain calibrated data, and then using the analysis software 122 to analyze the color of the object to be tested 300 according to the calibrated data to obtain the color analysis result of the object to be tested 300.

Since the invention is particularly sensitive to the influence of light, it is necessary to implement in a space where the ambient light can be controlled as far as possible to isolate the ambient light around the shooting space, or a shroud 220 can be provided around the space between the working platform 200 and the positioning frame 210 to isolate the ambient light.

Of course, an auxiliary light source 230 can also be arranged to illuminate on the object to be tested 300 and the two standard color carriers 400 to control the demand for light. The auxiliary light source 230 is arranged on the inner side of the shroud 220, which is not interfered by the ambient light, or it can be replaced by a photoflash lamp 130 arranged on the hand-held device 100.

Further, the analysis software 122 can adjust setting parameters of the camera 110 or the photoflash lamp 130 to optimize the color accuracy during shooting to obtain the best result.

Furthermore, the working platform 200 is provided with a pallet 240 for carrying the object to be tested 300, the pallet 240 can be movably inserted into or moved out of the working platform 200 to facilitate the placement or replacement of the object to be tested 300 to improve the operation efficiency.

Figure 4:
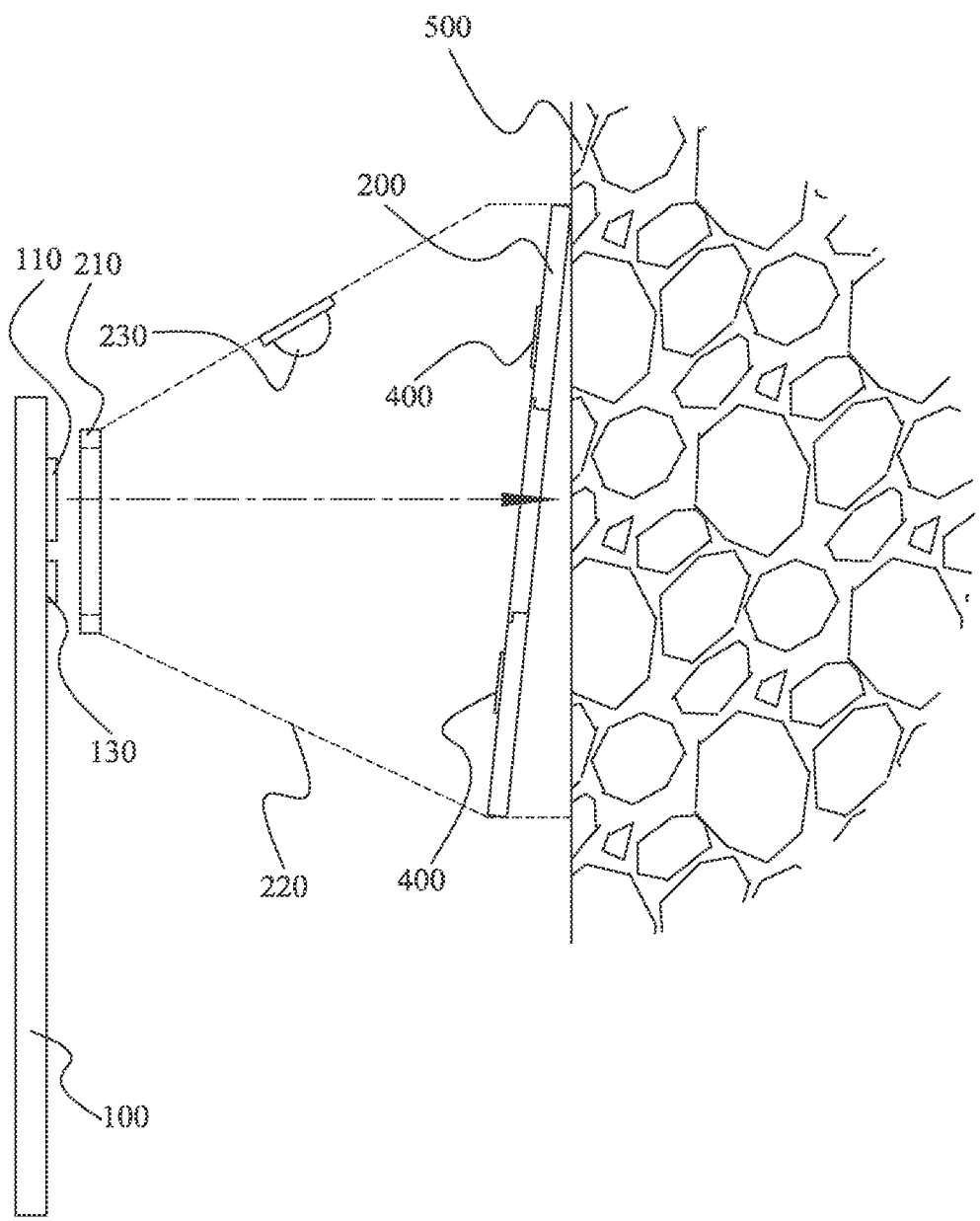
FIG. 4 is a variation diagram of an embodiment of the invention.

In addition, as shown in FIG. 4, when the invention is in the condition that the object to be tested 300 is not easy to sample, for example, for the color analysis of wood and paint on the wall 500, the pallet 240 can be removed, or the transparent pallet 240 can be used, and then the working platform 200 can be attached to the wall 500, so that the color shooting and analysis can be directly perform to simplify the work.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method for color analysis, comprising the step of:
    providing an ideal dataset corresponding to a plurality of ideal colors;
    setting at least one standard color around an object to be tested;
    forming an inclination angle between a camera of a hand-held device and the object to be tested, then shooting the object to be tested and the at least one standard color to obtain a standard image and a tested image, respectively; and
    using an analysis software in the hand-held device to compare a difference between the standard image and the ideal dataset to obtain a calibrated data;
    using the analysis software to obtains a color analysis result of the object to be tested base on the calibrated data.

2. The method for color analysis of claim 1 further comprising the step of:
    using the analysis software to transfer the standard image into a standard data;
    using the analysis software to transfer the tested image into a tested data; and
    comparing the difference between the standard image and the ideal dataset.

3. The method for color analysis of claim 1, wherein the standard image and the ideal dataset are compared by comparing the difference between the standard data and the ideal dataset.

4. The method for color analysis of claim 3 further comprising the step of:
    using the analysis software to obtain the color analysis result of the object to be tested based on the calibrated data by comparing the tested data and the calibrated data.

5. The method for color analysis of claim 1, wherein the at least one standard color is installed at front side, rear side, left side and right side of the object to be tested.

6. The method for color analysis of claim 1, wherein the at least one standard color is installed at both front and rear sides, left and right sides, front and left sides, front and right sides, rear and left sides or front and right sides of the object to be tested.

7. The method for color analysis of claim 1, wherein the camera needs to isolate ambient light around a shooting space when shooting the object to be tested and the at least one standard color.

8. The method for color analysis of claim 1, wherein brightness is improved by using a photoflash lamp of the hand-held device or setting an auxiliary light source to illuminate on the object to be tested and the at least one standard color when the camera shoots the object to be tested and the at least one standard color.

9. The method for color analysis of claim 1, wherein the analysis software adjusts setting parameters of the camera to optimize the color accuracy during shooting.

10. A system for color analysis, comprising:
    a hand-held device which is provided with a camera and installed with analysis software; and
    a working platform in which an object to be tested is placed, and at least one standard color carrier which is set near the object to be tested;
    wherein a positioning frame extends upward around the working platform, the positioning frame and the working platform which are mutually formed an inclination angle, and the positioning frame which is used to position the hand-held device, so that the camera is used to shoot the working platform in an inclined direction.

11. The system for color analysis of claim 10, wherein the at least one standard color carrier is installed at front side, rear side, right side or left side of the object to be tested.

12. The system for color analysis of claim 10, wherein the at least one standard color carrier is installed at both front and rear sides, left and right sides, front and left sides, front and right sides, rear and left sides or front and right sides of the object to be tested.

13. The system for color analysis of claim 10, wherein a shroud is provided around a space between the working platform and the positioning frame to isolate ambient light.

14. The system for color analysis of claim 13, wherein an auxiliary light source is arranged on an inner side of the shroud to illuminate on the object to be tested and the at least one standard color carrier to improve brightness.

15. The system for color analysis of claim 10, wherein the hand-held device is provided with a photoflash lamp to illuminate on the object to be tested and standard color on at least one standard color carrier to improve brightness.

16. The system for color analysis of claim 10, wherein the working platform is provided with a pallet for carrying the object to be tested, the pallet can be movably inserted into or moved out of the working platform.

* * * * *